US 8,147,333 B2

(12) United States Patent
Jawad et al.

(10) Patent No.: US 8,147,333 B2
(45) Date of Patent: Apr. 3, 2012

(54) HANDHELD CONTROL DEVICE FOR A PROCESSOR-CONTROLLED SYSTEM

(75) Inventors: Mark Jawad, Redmond, WA (US); Steve Rabin, Redmond, WA (US)

(73) Assignee: Nintendo Co. Ltd., Kyoto (JP)

( * ) Notice: Subject to any disclaimer, the term of this patent is extended or adjusted under 35 U.S.C. 154(b) by 784 days.

(21) Appl. No.: 12/149,923

(22) Filed: May 9, 2008

(65) Prior Publication Data

US 2008/0293492 A1 Nov. 27, 2008

Related U.S. Application Data

(60) Provisional application No. 60/924,324, filed on May 9, 2007.

(51) Int. Cl.
*A63F 9/24* (2006.01)
(52) U.S. Cl. .................................................. 463/37
(58) Field of Classification Search ............... 463/37–42
See application file for complete search history.

(56) References Cited

U.S. PATENT DOCUMENTS

| | | | |
|---|---|---|---|
| 5,440,326 A | 8/1995 | Quinn | |
| 5,574,479 A | 11/1996 | Odell | |
| 5,598,187 A | 1/1997 | Ide | |
| 5,627,565 A | 5/1997 | Morishita et al. | |
| 5,645,077 A | 7/1997 | Foxlin | |
| 5,757,360 A * | 5/1998 | Nitta et al. | 345/156 |
| 5,875,257 A | 2/1999 | Marrin et al. | |
| 6,545,661 B1 * | 4/2003 | Goschy et al. | 345/158 |
| 6,853,747 B1 | 2/2005 | Matsuura | |
| 6,982,697 B2 | 1/2006 | Wilson et al. | |
| 7,139,983 B2 | 11/2006 | Kelts | |
| 7,158,118 B2 | 1/2007 | Liberty | |
| 7,262,760 B2 | 8/2007 | Liberty | |
| 7,292,151 B2 | 11/2007 | Ferguson et al. | |
| 7,414,611 B2 | 8/2008 | Liberty | |
| 7,492,268 B2 | 2/2009 | Ferguson et al. | |
| 7,771,263 B2 * | 8/2010 | Telford | 463/3 |
| 2001/0024973 A1 * | 9/2001 | Meredith | 463/36 |
| 2004/0222969 A1 | 11/2004 | Bochenrieder | |
| 2004/0259651 A1 * | 12/2004 | Storek | 473/131 |
| 2006/0047447 A1 * | 3/2006 | Brady et al. | 702/41 |
| 2007/0049374 A1 | 3/2007 | Ikeda et al. | |
| 2007/0050597 A1 | 3/2007 | Ikeda | |
| 2007/0052177 A1 | 3/2007 | Ikeda et al. | |
| 2007/0060391 A1 | 3/2007 | Ikeda et al. | |
| 2007/0066394 A1 | 3/2007 | Ikeda et al. | |
| 2007/0072680 A1 | 3/2007 | Ikeda | |
| 2008/0242415 A1 * | 10/2008 | Ahmed | 463/39 |

OTHER PUBLICATIONS

ADXL202 Specification Sheet: Low Cost ±2 g Dual Axis i MEMs® Accelerometer with Digital Output; Analog Devices, Inc., 1998.
ADXL330 Specification Sheet: Small, Low Power, 3-Axis ±3 g i MEMs® Accelerometer; Analog Devices, Inc., 2007.
Pictures of Microsoft Xwand retrieved on May 13, 2009 from http://www.kf12.com/blogs/uploads/xwand.jpg and http://www.cs.cmu.edu/%7Edwilson/images/xwand.jpg.

(Continued)

*Primary Examiner* — Omkar Deodhar
(74) *Attorney, Agent, or Firm* — Nixon & Vanderhye P.C.

(57) ABSTRACT

An example system and method of providing an input to a processor-controlled system uses a handheld control device comprising an accelerometer. The example system and method involve determining magnitudes of outputs of the accelerometer for one or more axes based on movement of the handheld control device and controlling the processor-controlled system based at least in part on a combination of the determined magnitudes.

18 Claims, 8 Drawing Sheets

NON-LIMITING EXAMPLE GAME SYSTEM

OTHER PUBLICATIONS

Wilson, Andrew D., et al.; "Demonstration of the XWand Interface for Intelligent Spaces"; Microsoft Research; UIST '02 Companion; pp. 37-38.

Wilson, Daniel, et al.; "Gesture Recognition Using the XWand"; Robotics Institute; Carnegie Mellon University; tech report CMU-RI-TR-04-57; Apr. 2004.

Wilson, Andy, "XWand: UI for Intelligent Environments"; Apr. 26, 2004; retrieved May 12, 2009 from http://research.microsoft.com/en-us/um/people/awilson/wand/default.htm.

Wilson, Andrew, et al.; "XWand: UI for Intelligent Spaces"; Microsoft Research; CHI 2003, Apr. 5-10, 2003; Ft. Lauderdale, FL.

SELECTECH Air Mouse, Description; retrieved on May 5, 2009 from http://cgi.ebay.com.my/ws/eBayISAPI.dll?ViewItem&item=350096666675&indexURL.

Web pages from Wikipedia of "Kirby Tilt 'n' Tumble" retrieved on Nov. 9, 2009 from http://en.wikipedia.org/wiki/Kirby_Tilt_'n'_Tumble, 2 pages.

Web pages from Wikipedia of "WarioWare: Twisted!" retrieved on Nov. 9, 2009 from http://en.wikipedia.org/wiki/Wario_Ware_Twisted, 3 pages.

Marrin, Teresa: "Possibilities for the Digital Baton as a General-Purpose Gestural Interface," Late-Breaking/Short Talks, Hyperinstruments Research Group, MIT Media Laboratory, CHI 97, Mar. 1997, pp. 311-312.

\* cited by examiner

NON-LIMITING
EXAMPLE GAME SYSTEM

NON-LIMITING
EXAMPLE CONTROLLER

NON-LIMITING
EXAMPLE CONTROLLER

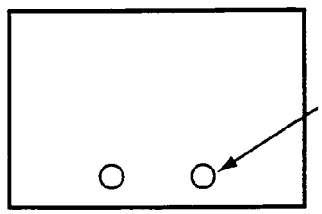

When controller 107 is pointed upward, the coordinates of the markers move down.

*Fig. 5B-1*

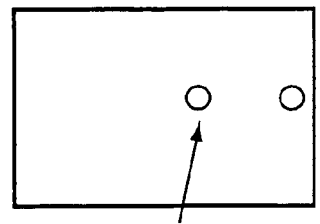

When controller 107 is pointed left, the coordinates of the markers move to the right.

*Fig. 5B-2*

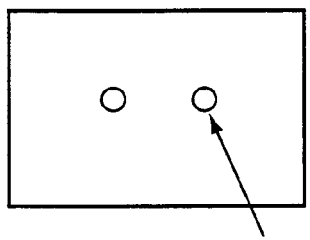

*Fig. 5B-3* When the markers are in the center of the coordinates, the controller 107 is pointing to the middle of the screen.

When controller 107 is pointed right, the coordinates of the markers move to the left.

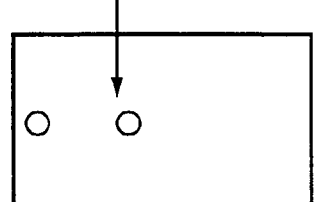

*Fig. 5B-4*

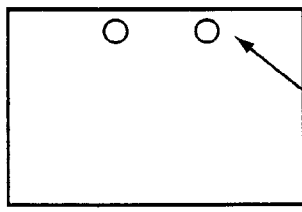

When controller 107 is pointed downward, the coordinates of the markers move up.

*Fig. 5B-5*

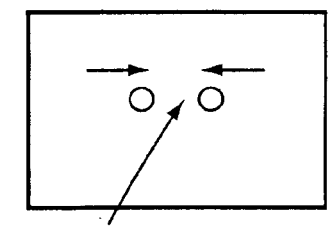

When controller 107 is moved away from markers 108a, 108b, the distance between the markers shrinks.

*Fig. 5B-6*

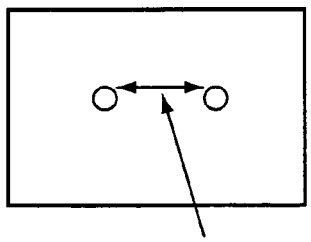

When controller 107 is moved toward markers 108a, 108b, the distance between the markers expands.

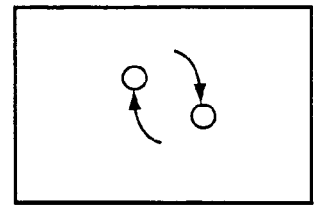

When controller 107 is rotated, the marker coordinates will rotate.

| MAGNITUDE | ACCELERATION |
|---|---|
| ⋮ | ⋮ |
| 2.7 | 5.4 |
| 2.8 | 5.6 |
| 2.9 | 5.8 |
| 3.0 | 6.0 |
| ⋮ | ⋮ |
| 3.9 | 7.8 |
| 4.0 | 8.0 |
| 4.1 | 8.2 |

HANDHELD CONTROL DEVICE FOR A PROCESSOR-CONTROLLED SYSTEM

CROSS-REFERENCE TO RELATED APPLICATION

This application claims the benefit of provisional Application No. 60/924,324, filed May 9, 2007, the contents of which are incorporated herein in their entirety.

BACKGROUND AND SUMMARY

This application generally describes a handheld control device such as a controller for a video game system and, more particularly, describes generating inputs to a video game system using a handheld control device.

User inputs to computer systems may be supplied in various ways. For example, when the computer system is a video game console, inputs are typically supplied using cross-switches, joysticks, buttons and the like provided on a controller. A cross-switch or a joystick may be used to control movement of a video game object in various directions and various buttons may be used to control character actions such as jumping, using a weapon and the like.

The controller described in this patent application additionally or alternatively includes an accelerometer arrangement that generates inputs to a video game console or other computer system based on certain movements and/or orientations of the controller. Such a controller can provide a more intuitive user interface in which, for example, movement of a video game object can be controlled by moving the controller in a particular manner. By way of illustration, a player may increase or decrease the altitude of a plane in a video game by tilting the controller up or down. The accelerometer arrangement can be used to provide gaming experiences that cannot be provided easily (if at all) using a controller having cross-switches, joysticks, buttons, etc.

This patent application describes example handheld control devices whose movements can be used to generate inputs to a processor-controlled system such as a video game system. By way of example and without limitation, the magnitude of one or more accelerometer outputs can be used to control the acceleration or speed of an object or character in a racing game. The greater the magnitude of the one or more accelerometer outputs, the faster the object or character moves.

In accordance with an example of the systems and methods described herein, a player moves (e.g., shakes) a controller for a video game system. The magnitude of accelerometer outputs for each axis (e.g., X-axis, Y-axis and Z-axis) is determined. Preferably, any contribution to the accelerometer outputs for these axes due to gravity is subtracted out of the magnitudes. All of the modified magnitudes are added together and this combined magnitude is used an influencing force on a game character or object.

By way of example without limitation, in a racing game, the influencing force may be acceleration, speed, and the like of a character or an object. To make the character or object move as fast as possible, the player's strategy is to move/shake the controller in a manner that produces the largest acceleration over all axes. To do this, the player can move the controller so that it constantly changes direction while moving very quickly. For example, moving the controller in a twisting "figure eight" motion may be a good strategy.

BRIEF DESCRIPTION OF THE DRAWINGS

FIGS. 5B-1 to 5B-8 are used in an explanation of how a direction in which example controller 107 is pointing is determined.

FIG. 6 shows an example embodiment of using a controller in accordance with the systems and methods described herein.

DETAILED DESCRIPTION OF EXAMPLE EMBODIMENTS

Figure 1:
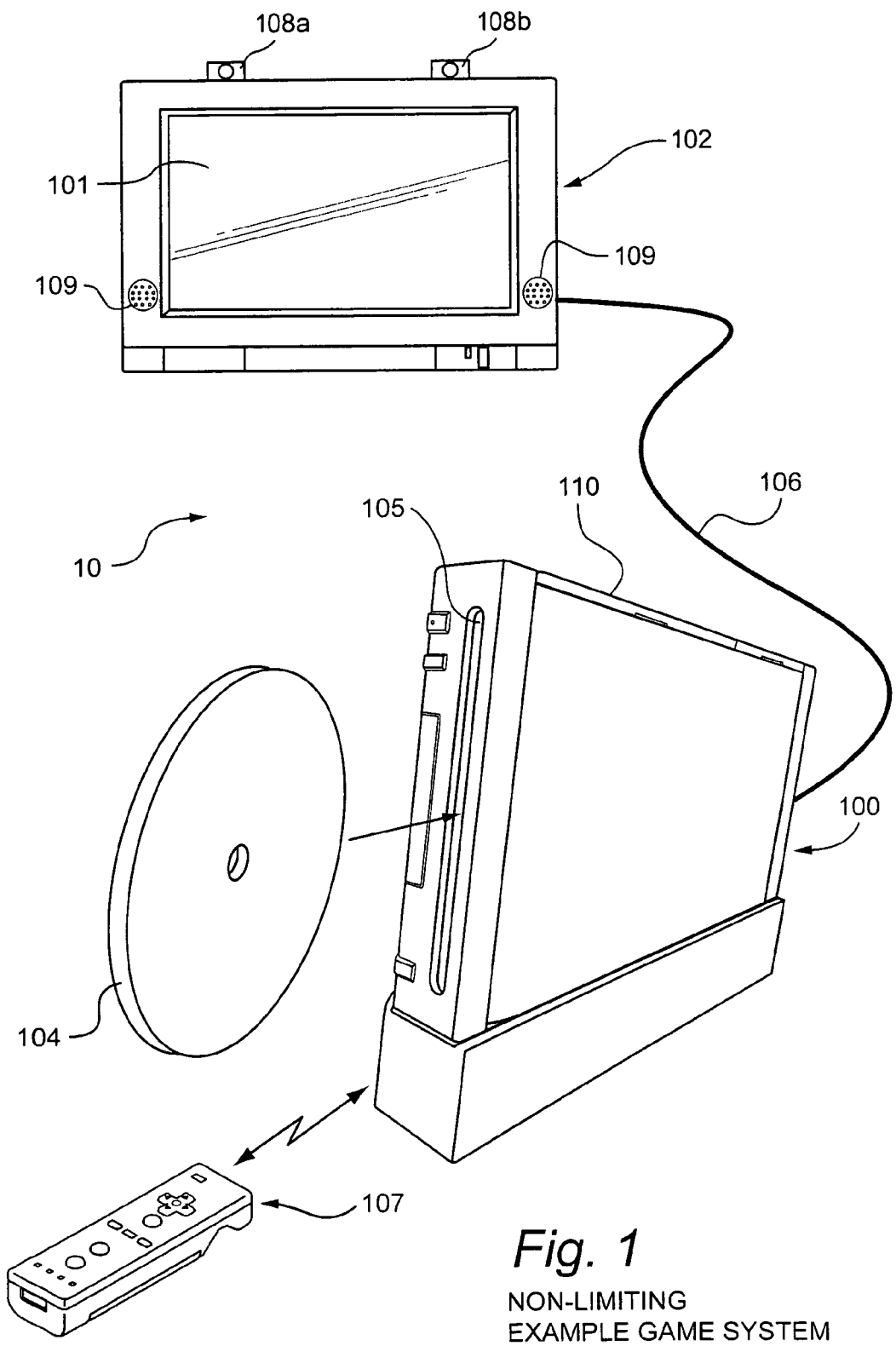
FIG. 1 is a diagram of an example game system 10.

FIG. 1 shows a non-limiting example game system 10 including a game console 100, a television 102 and a controller 107.

Game console 100 executes a game program or other application stored on optical disc 104 inserted into slot 105 formed in housing 110 thereof. The result of the execution of the game program or other application is displayed on display screen 101 of television 102 to which game console 100 is connected by cable 106. Audio associated with the game program or other application is output via speakers 109 of television 102. While an optical disk is shown in FIG. 1, the game program or other application may alternatively or additionally be stored on other storage media such as semiconductor memories, magneto-optical memories, magnetic memories and the like.

Controller 107 wirelessly transmits data such as game control data to the game console 100. The game control data may be generated using an operation section of controller 107 having, for example, a plurality of operation buttons, a key, a stick and the like. Controller 107 may also wirelessly receive data transmitted from game console 100. Any one of various wireless protocols such as Bluetooth (registered trademark) may be used for the wireless transmissions between controller 107 and game console 100.

As discussed below, controller 107 also includes an imaging information calculation section for capturing and processing images from light-emitting devices 108a and 108b. Although markers 108a and 108b are shown in FIG. 1 as being above television 100, they may also be positioned below television 100. In one implementation, a center point between light-emitting devices 108a and 108b is substantially aligned with a vertical center-line of display screen 101. The images from light-emitting devices 108a and 108b can be used to determine a direction in which controller 107 is pointing as well as a distance of controller 107 from display screen 101. By way of example without limitation, light-emitting devices 108a and 108b may be implemented as two LED modules (hereinafter, referred to as "markers") provided in the vicinity of the display screen of television 102. The markers each output infrared light and the imaging information calculation section of controller 107 detects the light output from the LED modules to determine a direction in which controller 107 is pointing and a distance of controller 107 from display 101 as mentioned above.

Figure 2:
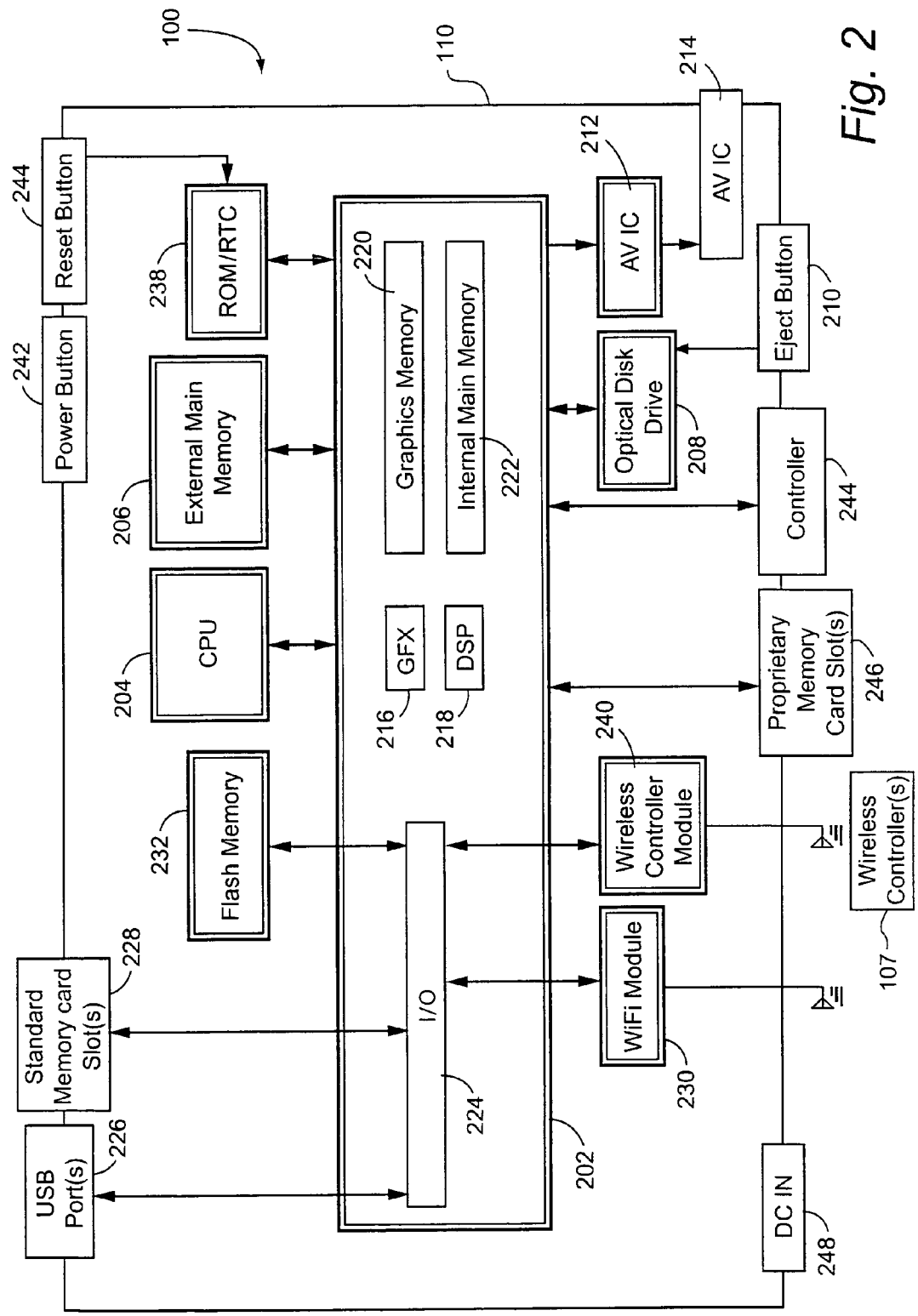
FIG. 2 is a block diagram of example game console 100 shown in FIG. 1.

With reference to the block diagram of FIG. 2, game console 100 includes a RISC central processing unit (CPU) 204 for executing various types of applications including (but not limited to) video game programs. CPU 204 executes a boot program stored, for example, in a boot ROM to initialize game console 100 and then executes an application (or applications) stored on optical disc 104, which is inserted in optical disk drive 208. User-accessible eject button 210 provided on housing 110 of game console 100 may be used to eject an optical disk from disk drive 208.

In one example implementation, optical disk drive 208 receives both optical disks of a first type (e.g., of a first size and/or of a first data structure, etc.) containing applications developed to take advantage of the capabilities of CPU 204 and graphics processor 216 and optical disks of a second type (e.g., of a second size and/or a second data structure) containing applications originally developed for execution by a CPU and/or graphics processor having capabilities different than those of CPU 204 and/or graphics processor 216. For example, the optical disks of the second type may be applications originally developed for the Nintendo GameCube platform.

CPU 204 is connected to system LSI 202 that includes graphics processing unit (GPU) 216 with an associated graphics memory 220, audio digital signal processor (DSP) 218, internal main memory 222 and input/output (IO) processor 224.

IO processor 224 of system LSI 202 is connected to one or more USB ports 226, one or more standard memory card slots (connectors) 228, WiFi module 230, flash memory 232 and wireless controller module 240.

USB ports 226 are used to connect a wide variety of external devices to game console 100. These devices include by way of example without limitation game controllers, keyboards, storage devices such as external hard-disk drives, printers, digital cameras, and the like. USB ports 226 may also be used for wired network (e.g., LAN) connections. In one example implementation, two USB ports 226 are provided.

Standard memory card slots (connectors) 228 are adapted to receive industry-standard-type memory cards (e.g., SD memory cards). In one example implementation, one memory card slot 228 is provided. These memory cards are generally used as data carriers but of course this use is provided by way of illustration, not limitation. For example, a player may store game data for a particular game on a memory card and bring the memory card to a friend's house to play the game on the friend's game console. The memory cards may also be used to transfer data between the game console and personal computers, digital cameras, and the like.

WiFi module 230 enables game console 100 to be connected to a wireless access point. The access point may provide internet connectivity for on-line gaming with players at other locations (with or without voice chat capabilities), as well as web browsing, e-mail, file downloads (including game downloads) and many other types of on-line activities. In some implementations, WiFi module 230 may also be used for communication with other game devices such as suitably-equipped hand-held game devices. Module 230 is referred to herein as "WiFi", which is generally a designation used in connection with the family of IEEE 802.11 specifications. However, game console 100 may of course alternatively or additionally use wireless modules that conform to other wireless standards.

Flash memory 232 stores, by way of example without limitation, game save data, system files, internal applications for the console and downloaded data (such as games).

Wireless controller module 240 receives signals wirelessly transmitted from one or more controllers 107 and provides these received signals to IO processor 224. The signals transmitted by controller 107 to wireless controller module 240 may include signals generated by controller 107 itself as well as by other devices that may be connected to controller 107. By way of example, some games may utilize separate right- and left-hand inputs. For such games, another controller (not shown) may be connected (e.g., by a wired connection) to controller 107 and controller 107 can transmit to wireless controller module 240 signals generated by itself and by the other controller.

Wireless controller module 240 may also wirelessly transmit signals to controller 107. By way of example without limitation, controller 107 (and/or another game controller connected thereto) may be provided with vibration circuitry and vibration circuitry control signals may be sent via wireless controller module 240 to control the vibration circuitry (e.g., by turning the vibration circuitry on and off). By way of further example without limitation, controller 107 may be provided with (or be connected to) a speaker (not shown) and audio signals for output from this speaker may be wirelessly communicated to controller 107 via wireless controller module 240. By way of still further example without limitation, controller 107 may be provided with (or be connected to) a display device (not shown) and display signals for output from this display device may be wirelessly communicated to controller 107 via wireless controller module 240.

Proprietary memory card slots 246 are adapted to receive proprietary memory cards. In one example implementation, two such slots are provided. These proprietary memory cards have some non-standard feature(s) such as a non-standard connector and/or a non-standard memory architecture. For example, one or more of the memory card slots 246 may be adapted to receive memory cards used with the Nintendo GameCube platform. In this case, memory cards inserted in such slots can transfer data from games developed for the GameCube platform. In an example implementation, memory card slots 246 may be used for read-only access to the memory cards inserted therein and limitations may be placed on whether data on these memory cards can be copied or transferred to other storage media such as standard memory cards inserted into slots 228.

One or more controller connectors 244 are adapted for wired connection to respective game controllers. In one example implementation, four such connectors are provided for wired connection to game controllers for the Nintendo GameCube platform. Alternatively, respective wireless receivers may be connected to connectors 244 to receive signals from wireless game controllers. These connectors enable players, among other things, to use controllers for the Nintendo GameCube platform when an optical disk for a game developed for this platform is inserted into optical disk drive 208.

A connector 248 is provided for connecting game console 100 to DC power derived, for example, from an ordinary wall outlet. Of course, the power may be derived from one or more batteries.

GPU 216 performs image processing based on instructions from CPU 204. GPU 216 includes, for example, circuitry for performing calculations necessary for displaying three-dimensional (3D) graphics. GPU 216 performs image processing using graphics memory 220 dedicated for image processing and a part of internal main memory 222. GPU 216 generates image data for output to television 102 by audio/video connector 214 via audio/video IC (interface) 212.

Audio DSP 218 performs audio processing based on instructions from CPU 204. The audio generated by audio DSP 218 is output to television 102 by audio/video connector 214 via audio/video IC 212.

External main memory 206 and internal main memory 222 are storage areas directly accessible by CPU 204. For example, these memories can store an application program such as a game program read from optical disc 104 by the CPU 204, various types of data or the like.

ROM/RTC 238 includes a real-time clock and preferably runs off of an internal battery (not shown) so as to be usable even if no external power is supplied. ROM/RTC 238 also may include a boot ROM and SRAM usable by the console.

Power button 242 is used to power game console 100 on and off. In one example implementation, power button 242 must be depressed for a specified time (e.g., one or two seconds) to turn the console off so as to reduce the possibility of inadvertently turn-off. Reset button 244 is used to reset (re-boot) game console 100.

Figure 3A:
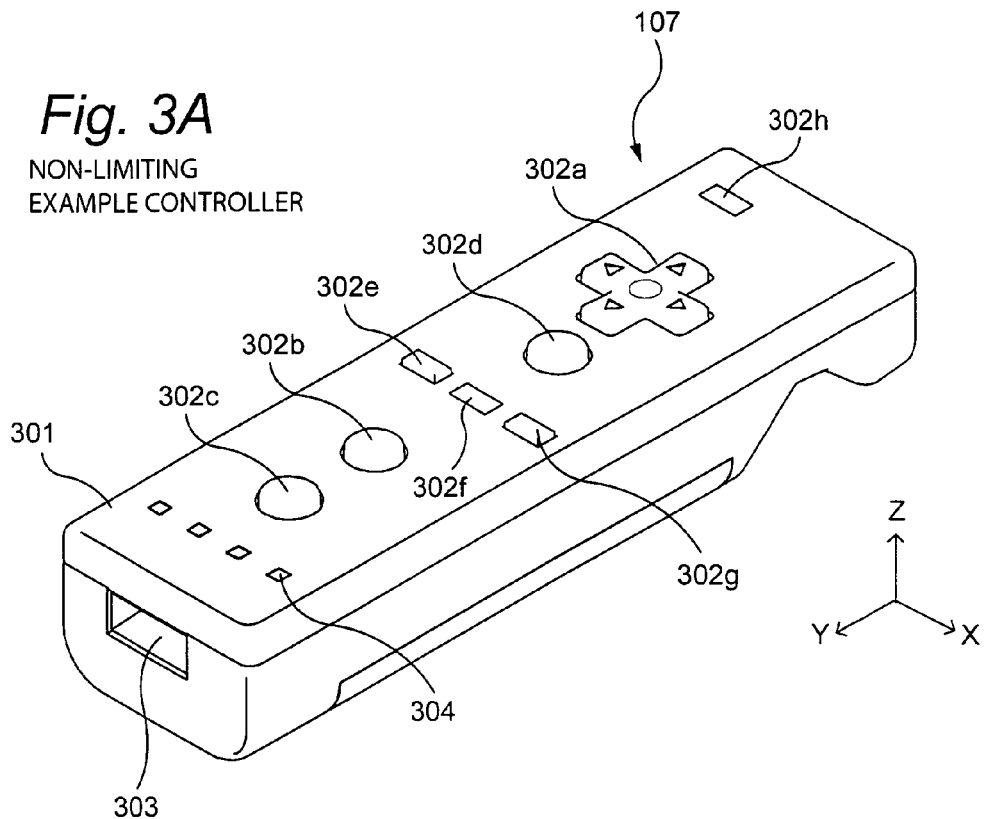
FIGS. 3A and 3B are perspective views of a top and a bottom of example controller 107 shown in FIG. 1.
Figure 3B:
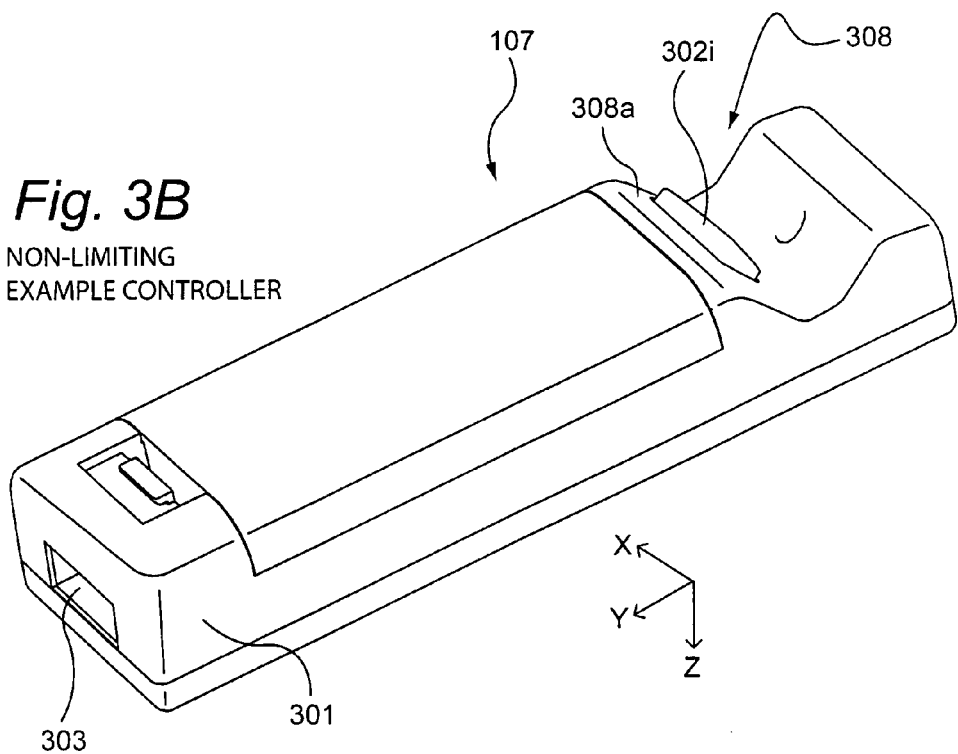
Figure 4:
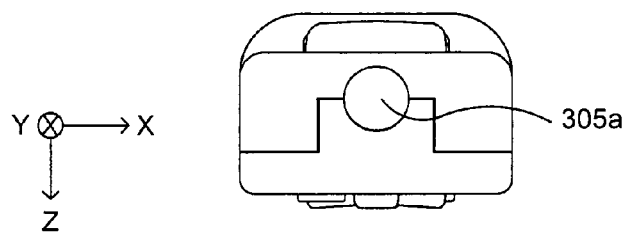
FIG. 4 is a front view of example controller 107 shown in FIG. 1.

With reference to FIGS. 3 and 4, example controller 107 includes a housing 301 on which operating controls 302a-302h are provided. Housing 301 has a generally parallelepiped shape and is sized to be conveniently grasped by a player's hand. Cross-switch 302a is provided at the center of a forward part of a top surface of the housing 301. Cross-switch 302a is a cross-shaped four-direction push switch which includes operation portions corresponding to the directions designated by the arrows (front, rear, right and left), which are respectively located on cross-shaped projecting portions. A player selects one of the front, rear, right and left directions by pressing one of the operation portions of the cross-switch 302a. By actuating cross-switch 302a, the player can, for example, move a character in different directions in a virtual game world.

Cross-switch 302a is described by way of example and other types of operation sections may be used. By way of example without limitation, a composite switch including a push switch with a ring-shaped four-direction operation section and a center switch may be used. By way of further example without limitation, an inclinable stick projecting from the top surface of housing 301 that outputs signals in accordance with the inclining direction of the stick may be used. By way of still further example without limitation, a horizontally slidable disc-shaped member that outputs signals in accordance with the sliding direction of the disc-shaped member may be used. By way of still further example without limitation, a touch pad may be used. By way of still further example without limitation, separate switches corresponding to at least four directions (e.g., front, rear, right and left) that output respective signals when pressed by a player can be used.

Buttons (or keys) 302b through 302g are provided rearward of cross-switch 302a on the top surface of housing 301. Buttons 302b through 302g are operation devices that output respective signals when a player presses them. For example, buttons 302b through 302d are respectively an "X" button, a "Y" button and a "B" button and buttons 302e through 302g are respectively a select switch, a menu switch and a start switch, for example. Generally, buttons 302b through 302g are assigned various functions in accordance with the application being executed by game console 100. In an exemplary arrangement shown in FIG. 3A, buttons 302b through 302d are linearly arranged along a front-to-back centerline of the top surface of housing 301. Buttons 302e through 302g are linearly arranged along a left-to-right line between buttons 302b and 302d. Button 302f may be recessed from a top surface of housing 701 to reduce the possibility of inadvertent pressing by a player grasping controller 107.

Button 302h is provided forward of cross-switch 302a on the top surface of the housing 301. Button 302h is a power switch for remote on-off switching of the power to game console 100. Button 302h may also be recessed from a top surface of housing 301 to reduce the possibility of inadvertent pressing by a player.

A plurality (e.g., four) of LEDs 304 is provided rearward of button 302c on the top surface of housing 301. Controller 107 is assigned a controller type (number) so as to be distinguishable from other controllers used with game console 100 and LEDs 304 may be used to provide a player a visual indication of this assigned controller number. For example, when controller 107 transmits signals to wireless controller module 240, one of the plurality of LEDs corresponding to the controller type is lit up.

With reference to FIG. 3B, a recessed portion 308 is formed on a bottom surface of housing 301. Recessed portion 308 is positioned so as to receive an index finger or middle finger of a player holding controller 107. A button 302i is provided on a rear, sloped surface 308a of the recessed portion. Button 302i functions, for example, as an "A" button which can be used, by way of illustration, as a trigger switch in a shooting game.

As shown in FIG. 4, an imaging element 305a is provided on a front surface of controller housing 301. Imaging element 305a is part of the imaging information calculation section of controller 107 that analyzes image data received from markers 108a and 108b. Imaging information calculation section 305 has a maximum sampling period of, for example, about 200 frames/sec., and therefore can trace and analyze even relatively fast motion of controller 107. Additional details of the operation of this section may be found in Application Nos. 60/716,937, entitled "VIDEO GAME SYSTEM WITH WIRELESS MODULAR HANDHELD CONTROLLER," filed on Sep. 15, 2005 (corresponding to U.S. Patent Publication No. 2007-0066394 A1); 60/732,648, entitled "INFORMATION PROCESSING PROGRAM," filed on Nov. 3, 2005 (corresponding to U.S. Patent Publication No. 2007-0072674 A1); and application No. 60/732,649, entitled "INFORMATION PROCESSING SYSTEM AND PROGRAM THEREFOR," filed on Nov. 3, 2005 (corresponding to U.S. Patent Publication No. 2007-0060228 A1). The entire contents of each of these applications are expressly incorporated herein.

Connector 303 is provided on a rear surface of controller housing 301. Connector 303 is used to connect devices to controller 107. For example, a second controller of similar or different configuration may be connected to controller 107 via connector 303 in order to allow a player to play games using game control inputs from both hands. Other devices including game controllers for other game consoles, input devices such as keyboards, keypads and touchpads and output devices such as speakers and displays may be connected to controller 107 using connector 303.

For ease of explanation in what follows, a coordinate system for controller 107 will be defined. As shown in FIGS. 3 and 4, a left-handed X, Y, Z coordinate system has been defined for controller 107. Of course, this coordinate system is described by way of example without limitation and the systems and methods described herein are equally applicable when other coordinate systems are used.

Figure 5A:
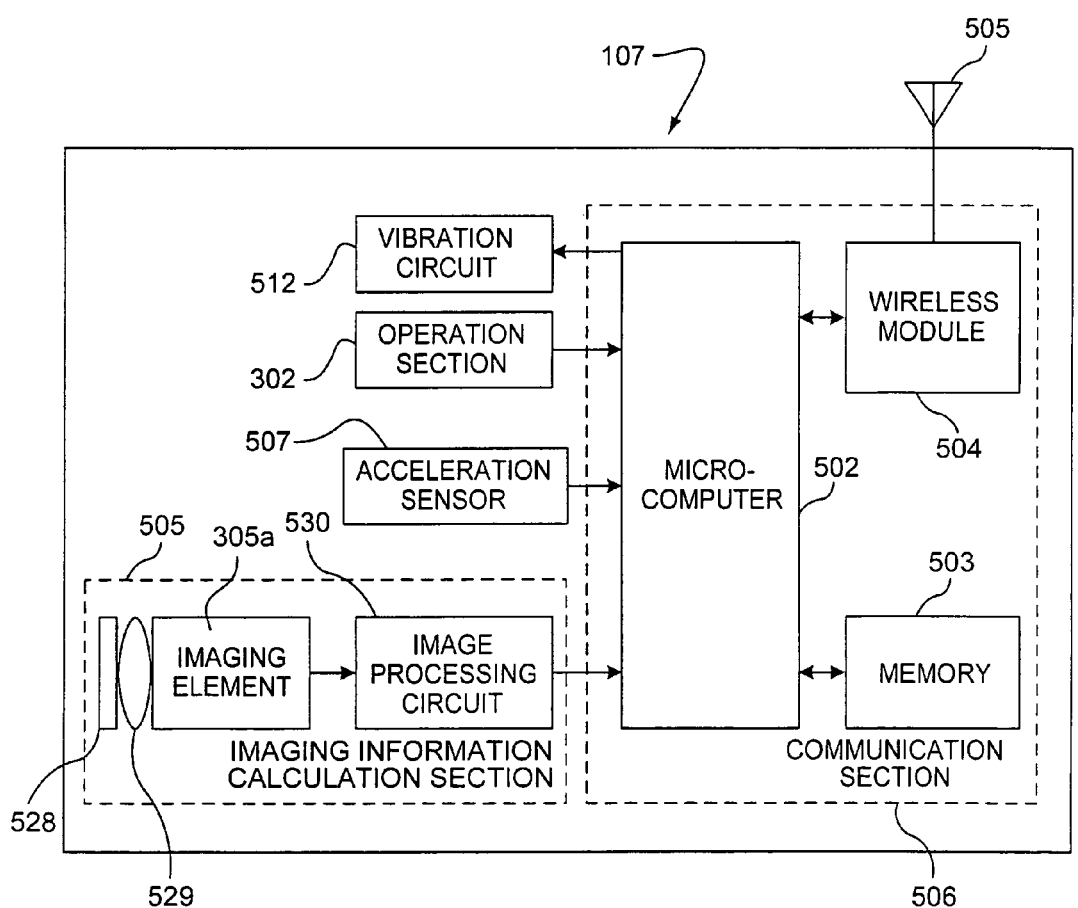
FIG. 5A is a block diagram of example controller 107 shown in FIG. 1.

As shown in the block diagram of FIG. 5A, controller 107 includes a three-axis, linear acceleration sensor 507 that detects linear acceleration in three directions, i.e., the up/down direction (Z-axis shown in FIGS. 3 and 4), the left/right direction (X-axis shown in FIGS. 3 and 4), and the forward/backward direction (Y-axis shown in FIGS. 3 and 4). Alternatively, a two-axis linear accelerometer that only detects linear acceleration along each of the Y-axis and Z-axis, for example, may be used or a one-axis linear accelerometer that only detects linear acceleration along the Z-axis, for example, may be used. Generally speaking, the accelerometer arrangement (e.g., three-axis or two-axis) will depend on the type of control signals desired. As a non-limiting example, the three-axis or two-axis linear accelerometer may be of the type available from Analog Devices, Inc. or STMicroelectronics N.V. Preferably, acceleration sensor 507 is an electrostatic capacitance or capacitance-coupling type that is based on silicon micro-machined MEMS (micro-electromechanical systems) technology. However, any other suitable accelerometer technology (e.g., piezoelectric type or piezoresistance type) now existing or later developed may be used to provide three-axis or two-axis linear acceleration sensor 507.

As one skilled in the art understands, linear accelerometers, as used in acceleration sensor 507, are only capable of detecting acceleration along a straight line corresponding to each axis of the acceleration sensor. In other words, the direct output of acceleration sensor 507 is limited to signals indicative of linear acceleration (static or dynamic) along each of the two or three axes thereof. As a result, acceleration sensor 507 cannot directly detect movement along a non-linear (e.g. arcuate) path, rotation, rotational movement, angular displacement, tilt, position, attitude or any other physical characteristic.

However, through additional processing of the linear acceleration signals output from acceleration sensor 507, additional information relating to controller 107 can be inferred or calculated (i.e., determined), as one skilled in the art will readily understand from the description herein. For example, by detecting static, linear acceleration (i.e., gravity), the linear acceleration output of acceleration sensor 507 can be used to determine tilt of the object relative to the gravity vector by correlating tilt angles with detected linear acceleration. In this way, acceleration sensor 507 can be used in combination with micro-computer 502 of controller 107 (or another processor) to determine tilt, attitude or position of controller 107. Similarly, various movements and/or positions of controller 107 can be calculated through processing of the linear acceleration signals generated by acceleration sensor 507 when controller 107 containing acceleration sensor 507 is subjected to dynamic accelerations by, for example, the hand of a user.

In another embodiment, acceleration sensor 507 may include an embedded signal processor or other type of dedicated processor for performing any desired processing of the acceleration signals output from the accelerometers therein prior to outputting signals to micro-computer 502. For example, the embedded or dedicated processor could convert the detected acceleration signal to a corresponding tilt angle (or other desired parameter) when the acceleration sensor is intended to detect static acceleration (i.e., gravity).

Returning to FIG. 5A, imaging information calculation section 505 of controller 107 includes infrared filter 528, lens 529, imaging element 305a and image processing circuit 530. Infrared filter 528 allows only infrared light to pass therethrough from the light that is incident on the front surface of controller 107. Lens 529 collects and focuses the infrared light from infrared filter 528 on imaging element 305a. Imaging element 305a is a solid-state imaging device such as, for example, a CMOS sensor or a CCD. Imaging element 305a captures images of the infrared light from markers 108a and 108b collected by lens 529. Accordingly, imaging element 305a captures images of only the infrared light that has passed through infrared filter 528 and generates image data based thereon. This image data is processed by image processing circuit 530 which detects an area thereof having high brightness, and, based on this detecting, outputs processing result data representing the detected coordinate position and size of the area to communication section 506. From this information, the direction in which controller 107 is pointing and the distance of controller 107 from display 101 can be determined.

Figure 5C:
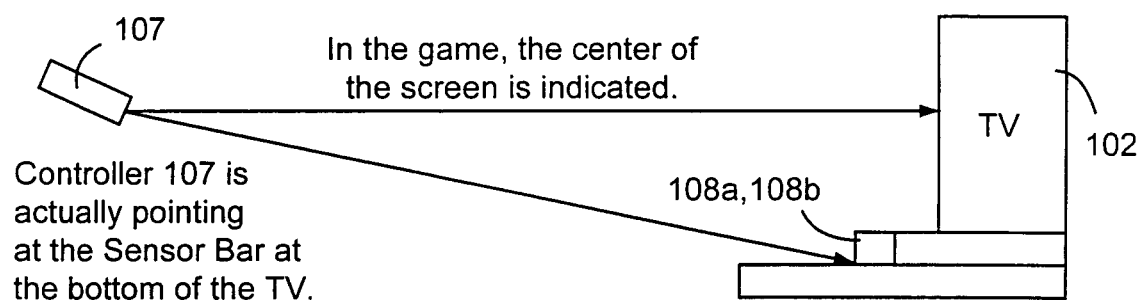
FIG. 5C is used in an explanation of the pointing direction of example controller 107.
Figure 6:
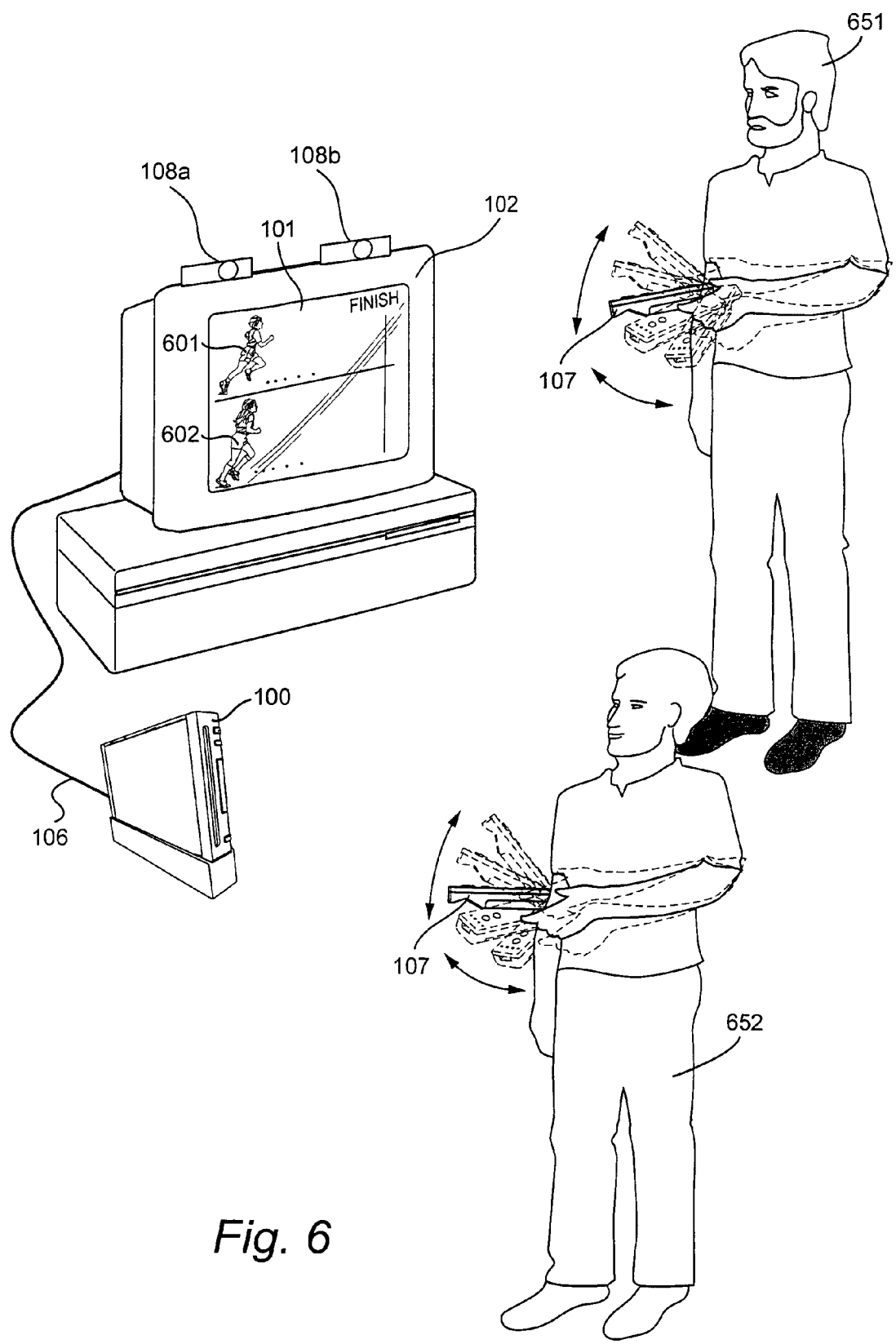

FIGS. 5B-1 to 5B-8 show how a rotation of the controller or a direction in which controller 107 is pointing can be determined using markers 108a, 108b. In this example implementation, controller 107 points to the intermediate coordinates of the two markers on the sensor bar. In an example implementation, the pointer coordinates are 0-1023 on the X-axis and 0-767 on the Y-axis. With reference to FIG. 5B-1, when controller 107 is pointed upward, the coordinates of the markers detected at remote control 107 move down. With reference to FIG. 5B-2, when controller 107 is pointed left, the coordinates of the markers move to the right. With reference to FIG. 5B-3, when the markers are centered, remote controller 107 is pointed at the middle of the screen. With reference to FIG. 5B-4, when controller 107 is pointed right, the coordinates of the markers move to the left. With reference to FIG. 5B-5, when controller 107 is pointed downward, the coordinates of the markers move up. With reference to FIG. 5B-6, when controller 107 is moved away from markers 108a, 108b, the distance between the markers is reduced. With reference to FIG. 5B-7, when controller 107 is moved toward markers 108a, 108b, the distance between the markers increases. With reference to FIG. 5B-8, when controller 107 is rotated, the marker coordinates will rotate.

FIG. 5C shows sensors 108a, 108b positioned below the display screen 101 of the television 102. As shown in FIG. 5C, when controller 107 is pointing toward the sensors, it is not actually pointing at the center of display screen 101. However, the game program or application executed by game machine 100 may treat this situation as one in which controller 107 is pointed at the center of the screen. In this case, the actual coordinates and the program coordinates will differ, but when the user is sufficiently far from the television, his or her brain automatically corrects for the difference between the coordinates seen by the eye and the coordinates for hand movement.

Again returning to FIG. 5A, vibration circuit 512 may also be included in controller 107. Vibration circuit 512 may be, for example, a vibration motor or a solenoid. Controller 107 is vibrated by actuation of the vibration circuit 512 (e.g., in response to signals from game console 100), and the vibration is conveyed to the hand of the player grasping controller 107. Thus, a so-called vibration-responsive game may be realized.

As described above, acceleration sensor 507 detects and outputs the acceleration in the form of components of three axial directions of controller 107, i.e., the components of the up-down direction (Z-axis direction), the left-right direction (X-axis direction), and the front-rear direction (the Y-axis direction) of controller 107. Data representing the acceleration as the components of the three axial directions detected by acceleration sensor 507 is output to communication section 506. Based on the acceleration data which is output from acceleration sensor 507, a motion of controller 107 can be determined.

Communication section 506 includes micro-computer 502, memory 503, wireless module 504 and antenna 505. Micro-computer 502 controls wireless module 504 for transmitting and receiving data while using memory 503 as a storage area during processing. Micro-computer 502 is supplied with data including operation signals (e.g., cross-switch, button or key data) from operation section 302, acceleration signals in the three axial directions (X-axis, Y-axis and Z-axis direction acceleration data) from acceleration sensor 507, and processing result data from imaging information calculation section 505. Micro-computer 502 temporarily stores the data supplied thereto in memory 503 as transmission data for transmission to game console 100. The wireless transmission from communication section 506 to game console 100 is performed at predetermined time intervals. Because game processing is generally performed at a cycle of 1/60 sec. (16.7 ms), the wireless transmission is preferably performed at a cycle of a shorter time period. For example, a communication section structured using Bluetooth (registered trademark) technology can have a cycle of 5 ms. At the transmission time, micro-computer 502 outputs the transmission data stored in memory 503 as a series of operation information to wireless module 504. Wireless module 504 uses, for example, Bluetooth (registered trademark) technology to send the operation information from antenna 505 as a carrier wave signal having a specified frequency. Thus, operation signal data from operation section 302, the X-axis, Y-axis and Z-axis direction acceleration data from acceleration sensor 507, and the processing result data from imaging information calculation section 505 are transmitted from controller 107. Game console 100 receives the carrier wave signal and demodulates or decodes the carrier wave signal to obtain the operation information (e.g., the operation signal data, the X-axis, Y-axis and Z-axis direction acceleration data, and the processing result data). Based on this received data and the application currently being executed, CPU 204 of game console 100 performs application processing. If communication section 506 is structured using Bluetooth (registered trademark) technology, controller 107 can also receive data wirelessly transmitted thereto from devices including game console 100.

In accordance with an example of the systems and methods described herein, a player moves (e.g., shakes) a controller for a video game system. The magnitude of the accelerometer output for each axis (e.g., X-axis, Y-axis and Z-axis) is determined. Preferably, any contribution to the accelerometer outputs for these axes due to gravity is subtracted out of the magnitudes. All of the modified magnitudes are added together and this combined acceleration is used an influencing force on a game character or object.

By way of example without limitation, in a racing game, the influencing force may be acceleration, speed, and the like of a game character or an object. To make the character or object move as fast as possible, the player's strategy is to move/shake the controller in a manner that produces the largest acceleration over all axes. To do this, the player can move the controller so that it constantly changes direction while moving very quickly. For example, moving the controller in a twisting "figure eight" motion may be a good strategy.

In an example embodiment described with reference to FIG. 6, accelerometer outputs for all axes (i.e., the X-axis, the Y-axis and the Z-axis) are combined to determine accelerations of characters displayed on display screen 101 of television 102 to which game console 100 is connected by cable 106. FIG. 6 shows characters 601 and 602 on display screen 101. These characters are part of an example running race game in which a first player 651 is provided with a controller that controls movement of character 601 and a second player 652 is provided with a controller that controls movement of character 602. When the race begins, each player moves his/her controller, thereby generating outputs from the accelerometer arrangements contained in his/her respective controllers. In this example running race game, magnitudes of accelerometer outputs for all axes (i.e., the X-axis, the Y-axis and the Z-axis) are combined to determine an acceleration of the character running in the race. The greater the combined magnitudes, the greater the acceleration and the faster the character runs. Thus, in this example game, the player attempts to move the controller in such a way to maximize the accelerometer outputs for each axis (e.g., by moving the controller as fast as the player can in different directions). The character that reaches the finish line first wins the race.

In this example, the combined magnitudes of the accelerometer outputs for all axes are used to accelerate a character along a specified curved or straight path (e.g., on a race track). In other words, the video game program may specify a path along which the game character or object will move and the combined magnitudes are used to determine the accelerations of the game character along that specified path.

The combining of the magnitudes may be performed in many ways and the systems and methods described herein are not limited to any particular manner of combining. In one example implementation, the magnitudes (i.e., the absolute values) of the X-axis output, the Y-axis output and the Z-axis output may simply be summed together (e.g., after removing any effects due to gravity). Thus, a magnitude of 1.2 units for the X-axis output, 1.4 units for the Y-axis output and 1.4 units for the Z-axis output would result in a total magnitude of 4.0 units. A mathematical formula or a look-up table may be used to convert the resulting sum to an acceleration. That is, the resulting sum of 4.0 units may be plugged into a formula to determine acceleration or used to access a look-up table which contains an acceleration corresponding to a sum of 4.0 units.

Figures 7A, 7B:
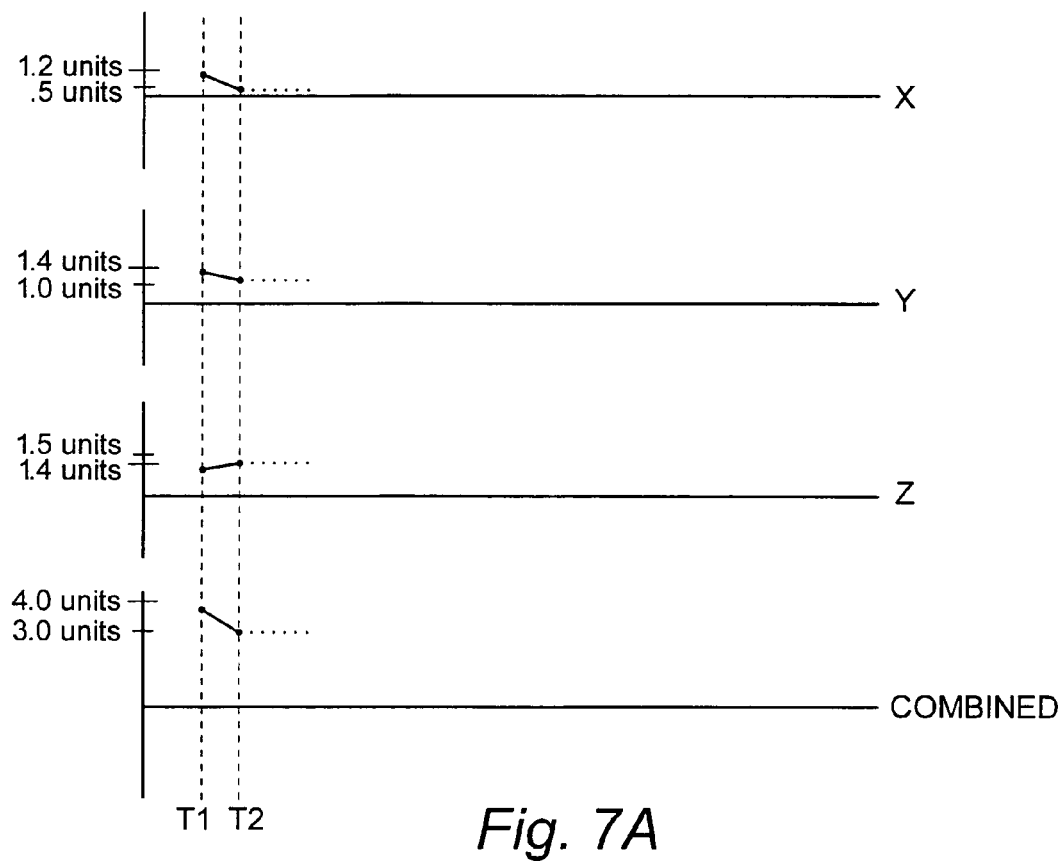
FIG. 7A is an example graphical representation showing summing of magnitudes of accelerometer outputs.
FIG. 7B shows an example look-up table relating summed magnitudes to acceleration.

FIG. 7A is an example graphical representation showing summing of the magnitudes. As shown in FIG. 7A, the magnitudes of the X-axis, Y-axis and Z-axis accelerometer outputs at time T1 are 1.2 units, 1.4 units and 1.4 units respectively. Thus, the summed magnitude is 4.0 units. With reference to the table shown in FIG. 7B, a magnitude of 4.0 units corresponds to an acceleration of 8.0 units and the game character therefore accelerates at this rate. At time T2, the outputs are 0.5, 1.0 and 1.5 units, respectively, so that the summed magnitude is 3.0 units. With reference to the table shown in FIG. 7B, a magnitude of 3.0 units corresponds to an acceleration of 6.0 units and the game character now therefore accelerates at this rate.

In another example implementation, an average of the magnitudes may be used and this average value may be converted into an acceleration using a mathematical formula or a look-up table. In still other example implementations, the respective accelerometer magnitudes may be weighted so that, for example, accelerometer outputs for one of the axes make a greater contribution to the acceleration than accelerometer outputs for one or more of the other axes.

Moreover, magnitudes of accelerometer outputs from less than all axes (e.g., from one or two of the three axes if a three-axis accelerometer is used) may be combined. It is also possible to dynamically vary which outputs are used so that, for example, the X-axis, Y-axis and Z-axis outputs are used for one portion of a game while only the X-axis and Y-axis outputs are used in another different part of the game.

The game may also be user-configurable so that a player can choose which accelerometer outputs are to be used. This configuration may be set using, for example, a menu system. The "resistance" of the character to movement may also be varied within a game or from game to game so that the same combined magnitude will result in different accelerations. Here again, the "resistance" may be user configurable.

While the combined magnitudes are described above as being converted into an acceleration, the systems and methods described herein are not limited in this respect and the combined magnitudes may be example be converted into speed or directly into a new position for a character.

The systems and methods described herein may be implemented in hardware, firmware, software and combinations thereof. Software or firmware may be executed by a general-purpose or specific-purpose computing device including a processing system such as a microprocessor and a microcontroller. The software may, for example, be stored on a storage medium (optical, magnetic, semiconductor or combinations thereof) and loaded into a RAM for execution by the processing system. The systems and methods described herein may also be implemented in part or whole by hardware such as application specific integrated circuits (ASICs), field programmable gate arrays (FPGAs), logic circuits and the like.

While the systems and methods have been described in connection with what is presently considered to practical and preferred embodiments, it is to be understood that these systems and methods are not limited to the disclosed embodiments, but on the contrary, is intended to cover various modifications and equivalent arrangements included within the spirit and scope of the appended claims.

We claim:

1. A control method for a processor-controlled system using a handheld control device comprising an accelerometer, the method comprising:
   determining numerical magnitudes corresponding to outputs of the accelerometer for one or more axes based on movement of the handheld control device;
   determining a movement value of an object displayed on the display device by cross-referencing a combined value of the determined numerical magnitudes with a corresponding movement value; and
   controlling a movement characteristic of the object displayed on the display device of the processor-controlled system based on the determined movement value.

2. The method according to claim 1, wherein the determining comprises determining numerical magnitudes corresponding to outputs of the accelerometer for two or more axes based on movement of the handheld control device.

3. The method according to claim 1, wherein the determining comprises determining numerical magnitudes corresponding to outputs of the accelerometer for three axes based on movement of the handheld control device.

4. A non-transitory computer-readable medium having computer readable code embodied therein for use in the execution in a computer of a method according to claim 1.

5. An image processing system comprising:
   one or more processors for generating a display comprising at least one display object; and
   a controller comprising an accelerometer,
   wherein the one or more processors:
      determine a movement value of the display object by cross-referencing a combined value of numerical magnitudes, corresponding to accelerometer outputs for one or more axes resulting from movement of the controller, with a corresponding movement value; and
      control a movement characteristic of the at least one display object on the display based on the determined movement value.

6. The image processing system according to claim 5, wherein the numerical magnitudes corresponding to accelerometer outputs for one or more axes are adjusted to remove effects of gravity.

7. A method for controlling movement of an object displayed on a display screen using a handheld control device comprising an accelerometer, the method comprising:
   receiving data indicative of numerical magnitudes corresponding to outputs of the accelerometer for one or more axes based on movement of the handheld control device;
   mathematically combining the numerical magnitudes to obtain a combined value;
   cross-referencing the combined value with a corresponding movement value to find a determined movement value; and
   controlling a movement characteristic of the object on the display screen based on the determined movement value.

8. The method according to claim 7, wherein the mathematically combining comprises summing the numerical magnitudes.

9. The method according to claim 7, further comprising:
   weighting one or more of the numerical magnitudes prior to the mathematical combining.

10. The method according to claim 7, further comprising:
    dynamically varying which ones of the numerical magnitudes are mathematically combined.

11. The method according to claim 7, further comprising:
    setting which ones of the numerical magnitudes are mathematically combined.

12. The method according to claim 7, wherein the object is a video game character.

13. The method according to claim 7, wherein the mathematically combining produces an average of the numerical magnitudes.

14. A system for controlling movement of an object displayed on a display screen using a handheld control device comprising an accelerometer, the system comprising:
    a receiver for receiving data indicative of numerical magnitudes corresponding to outputs of the accelerometer for one or more axes based on movement of the handheld control device; and
    a processing system for mathematically combining the determined numerical magnitudes to obtain a combined value, cross-referencing the combined value with a corresponding movement value to find a determined movement value, and controlling a movement characteristic of the object on the display screen based on the determined movement value.

15. The system according to claim 14, wherein the processing system weights the numerical magnitudes prior to the mathematical combining.

16. The system according to claim 14, wherein the processing system dynamically varies which ones of the numerical magnitudes are mathematically combined.

17. The system according to claim 14, wherein the processing system mathematically combines the numerical magnitudes to produce an average of the magnitudes.

18. A system for controlling movement of an object along a predetermined path, the system comprising:
- a computer-generated display device displaying the movement of the object;
- a controller device having an accelerometer; and
- a processing device for controlling the movement of the object along the predetermined path and configured to:
  - determine magnitudes of outputs of the accelerometer for two or more axes based on motion of the controller device,
  - determine a movement value of an object displayed on the display device by cross-referencing an arithmetic sum of the determined magnitudes with a corresponding movement value, and
  - control a movement characteristic of the object along the predetermined path based on the determined movement value, whereby motion of the controller device that produces larger magnitudes for the two or more axes will provide a larger movement characteristic than motion of the controller device that produces smaller magnitudes for the two or more axes.

* * * * *

UNITED STATES PATENT AND TRADEMARK OFFICE
Certificate

Patent No. 8,147,333 B2                                                              Patented: April 3, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Mark Jawad, Redmond, WA (US); Steve Rabin, Redmond, WA (US); and Nathaniel Guy, Redmond, WA (US).

Signed and Sealed this Seventh Day of January 2014.

DAVID L. LEWIS
Supervisory Patent Examiner
Art Unit 3714
Technology Center 3700